United States Patent
Rajendran et al.

(10) Patent No.: US 12,531,856 B2
(45) Date of Patent: Jan. 20, 2026

(54) CLOUD BASED AUTOMATED SECRETS ROTATION

(71) Applicant: Oracle International Corporation, Redwood Shores, CA (US)

(72) Inventors: Archana Babu Rajendran, Tamil Nadu (IN); Harshit Agarwal, Bengaluru (IN); Vishal Mishra, Odisha (IN); Mauruthi Geetha Mohan, Seattle, WA (US); Kranthi Kumar Bathula, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 237 days.

(21) Appl. No.: 18/488,133

(22) Filed: Oct. 17, 2023

(65) Prior Publication Data

US 2025/0126114 A1    Apr. 17, 2025

(51) Int. Cl.
*H04L 29/00*     (2006.01)
*H04L 9/40*      (2022.01)

(52) U.S. Cl.
CPC ........ *H04L 63/0846* (2013.01); *H04L 63/102* (2013.01); *H04L 63/20* (2013.01)

(58) Field of Classification Search
CPC .... H04L 63/0846; H04L 63/102; H04L 63/20
See application file for complete search history.

(56) References Cited

U.S. PATENT DOCUMENTS

| | | | | |
|---|---|---|---|---|
| 10,162,978 B2 * | 12/2018 | Sun | ........................ | G06F 21/602 |
| 10,313,121 B2 * | 6/2019 | Young | .................... | G06F 21/575 |
| 10,437,968 B2 * | 10/2019 | Hensgen | ............... | H04L 9/0861 |
| 11,144,513 B1 * | 10/2021 | Padisetty | .............. | G06F 16/122 |
| 11,288,359 B1 * | 3/2022 | Caldwell | ............... | H04L 63/102 |
| 11,849,037 B1 * | 12/2023 | Tong | ........................ | G06F 9/541 |
| 12,086,233 B2 * | 9/2024 | Khaund | ................. | G06F 21/604 |
| 12,158,973 B1 * | 12/2024 | Nilles | ................... | H04L 9/0891 |
| 2002/0161834 A1 * | 10/2002 | Rescorla | ............... | H04L 69/163 |
| | | | | 709/228 |

(Continued)

FOREIGN PATENT DOCUMENTS

WO    2020258105 A1    12/2020

OTHER PUBLICATIONS

Charles, "Store and Rotate API Keys with AWS Secrets Manager," 33 pages, Mar. 17, 2019.

(Continued)

*Primary Examiner* — Don G Zhao
(74) *Attorney, Agent, or Firm* — Potomac Law Group, PLLC

(57) ABSTRACT

Embodiments are directed to a cloud based rotation of a secret stored in a secrets storage and stored in a target system. Embodiments receive an identifier of a function for rotating the secret or an identifier of the target system when the target system includes a management Application Programming Interface ("API") for rotating the secret. Embodiments determine that the secret needs to be rotated based on a rotating schedule. When the identifier of the function is received, embodiments rotate the secret using the function and when the identifier of the target system is received, embodiments rotate the secret using the management API. Rotating the secret includes updating the secret at the secret storage and at the target system.

20 Claims, 8 Drawing Sheets

(56) References Cited

U.S. PATENT DOCUMENTS

| | | | |
|---|---|---|---|
| 2013/0223696 A1* | 8/2013 | Azar | G06V 40/16 |
| | | | 382/118 |
| 2014/0136327 A1* | 5/2014 | Gopavarapu | G06Q 30/0267 |
| | | | 705/14.58 |
| 2017/0011213 A1* | 1/2017 | Cavanagh | H04L 67/02 |
| 2017/0011214 A1* | 1/2017 | Cavanagh | H04L 63/0846 |
| 2018/0316676 A1* | 11/2018 | Gilpin | H04L 9/0891 |
| 2021/0058376 A1* | 2/2021 | Teissonniere | H04L 9/0643 |
| 2021/0195418 A1* | 6/2021 | Reid | H04W 12/61 |
| 2021/0234835 A1* | 7/2021 | Chen | H04L 67/1001 |
| 2022/0086142 A1* | 3/2022 | Hecht | H04L 63/102 |
| 2022/0286446 A1* | 9/2022 | Hecht | H04L 63/101 |
| 2022/0318370 A1* | 10/2022 | Khaund | G06F 21/46 |
| 2022/0321562 A1* | 10/2022 | Sholtis | H04L 63/102 |
| 2022/0417241 A1* | 12/2022 | Zilbershtein | H04L 9/3247 |
| 2023/0056518 A1* | 2/2023 | Nie | G06Q 20/4097 |
| 2023/0079608 A1 | 3/2023 | Chen et al. | |
| 2024/0338471 A1* | 10/2024 | Agrawal | G06F 21/6218 |
| 2025/0007709 A1* | 1/2025 | Shelef | H04L 9/0891 |

OTHER PUBLICATIONS

Unknown, "Automatically rotating secrets," Product Guide, Secrets Manager, 7 pages, May 12, 2023.

Unknown, "Client secret rotation and key management," Okta Developer, 8 pages, May 30, 2023.

Unknown, "Handling KeyVault secret rotation changes utilized by an Azure Function," Code Samples, Microsoft Learn 15 pages, Apr. 22, 2022.

Unknown, "Multi-user secrets rotation for Amazon RDS," Data Integration Info, 16 pages, 2022.

Unknown, "Rotate AWS Secrets Manager secrets—AWS Secrets Manager," Amazon.com, 3 pages, May 30, 2023.

Unknown, "Rotation tutorial for resources with two sets of credentials," Microsoft Learn, 14 pages, Jan. 21, 2023.

* cited by examiner

CLOUD BASED AUTOMATED SECRETS ROTATION

FIELD

One embodiment is directed generally to the storage of secrets, such as passwords, and in particular to an automated rotation of stored secrets.

BACKGROUND INFORMATION

"Secrets" can include database passwords, identity username/passwords, private SSH keys, etc. A cloud based infrastructure may include a central storage for secrets, and the secrets may also be simultaneously stored at the target system (e.g., a database). Many organizations, such as government organizations, have stringent security requirements, such as requiring the secrets be rotated every 60 or 90 days. This requires the secrets to be rotated/changed at both the central storage and the target systems.

SUMMARY

Embodiments are directed to a cloud based rotation of a secret stored in a secrets storage and stored in a target system. Embodiments receive an identifier of a function for rotating the secret or an identifier of the target system when the target system includes a management Application Programming Interface ("API") for rotating the secret. Embodiments determine that the secret needs to be rotated based on a rotating schedule. When the identifier of the function is received, embodiments rotate the secret using the function and when the identifier of the target system is received, embodiments rotate the secret using the management API. Rotating the secret includes updating the secret at the secret storage and at the target system.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Embodiments are a cloud based automated secrets rotation system that uses an API of a target system or a functions based approach to rotate secrets at both a centralized secrets manager and at the target system. Embodiments further use a dual secrets account rotation that alternates secrets rotation between two users having the same permissions.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
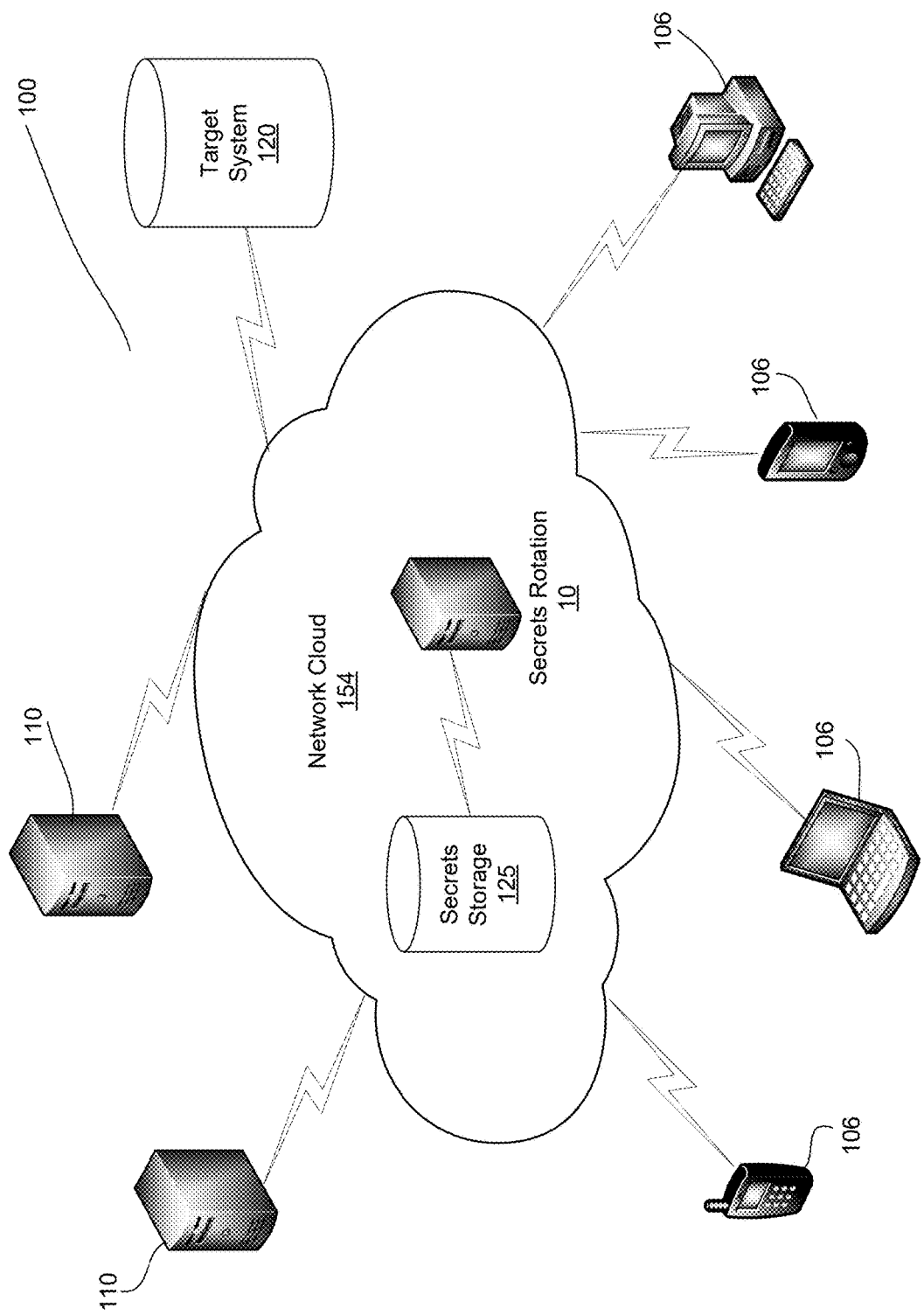
FIG. 1 illustrates an example of a system that includes a secrets rotation system in accordance to embodiments.

FIG. 1 illustrates an example of a system 100 that includes a secrets rotation system 10 in accordance to embodiments. Secrets rotation system 10 may be implemented within a computing environment that includes a communication network/cloud 104. Network 104 may be a private network that can communicate with a public network (e.g., the Internet) to access additional services 110 provided by a cloud services provider (i.e., a cloud infrastructure). Examples of communication networks include a mobile network, a wireless network, a cellular network, a local area network ("LAN"), a wide area network ("WAN"), other wireless communication networks, or combinations of these and other networks.

Secrets rotation system 10 provides functionality for rotating secrets, such as API keys, cloud and database credentials, database passwords, identity username/passwords, private SSH keys, etc., that are stored in secrets storage/vault 125, which stores secrets used by clients of cloud 104, including by any target systems 120 coupled to cloud 104. The secrets are also stored in the target systems. Secrets rotation system 10 may be administered by a service provider, such as via the Oracle Cloud Infrastructure ("OCI") from Oracle Corp. For an OCI implementation, secrets rotation system 10 and secrets storage 125 form part of a Secrets in Vault ("SiV") service. SiV allows OCI customers to securely store secrets on the OCI platform. The service enables customers to manage the lifecycle of secrets using operations such as versioning, archival etc. Secrets are encrypted at rest with encryption keys stored in a key management service ("KMS") Vault 125. Each secret consists of immutable secret versions, which store the actual secret content, encrypted. Rotating a secret involves creating a new version which becomes the latest version for that secret.

Tenants of the cloud services provider can be organizations or groups whose members include users of services offered by the service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 106, which can be any type of device that can access network 104 and can obtain the benefits of the functionality of secrets rotation system 10 for rotating secrets stored at both a secrets storage 125 and a target system 120. As disclosed herein, a "client" (also disclosed as a "client system" or a "client device") may be a device or an application executing on a device. System 100 includes a number of different types of client devices 106 that each is able to communicate with network 104.

One or more target systems 120 are any type of system that requires a secret which is stored locally to the target system 120 as well as in secrets storage 125. Target system 120 can be located on cloud 104, on a different cloud, or on-premises. In general, a target system is a system whose credentials are stored in secrets storage 125 and have mandated to rotate their secrets. In one embodiment, target system 120 is a database system and may be an autonomous database ("ADB"), which is a cloud database that uses machine learning to automate database tuning, security, backups, updates, and other routine management tasks traditionally performed by database administrators, such as the "ADB" from Oracle Corp. Other examples of target system 120 include "Postgres", a structured query language ("SQL") server, identity credentials such as keys for the Society for Worldwide Interbank Financial Telecommunications ("SWIFT") payment system, etc.

Figure 2:
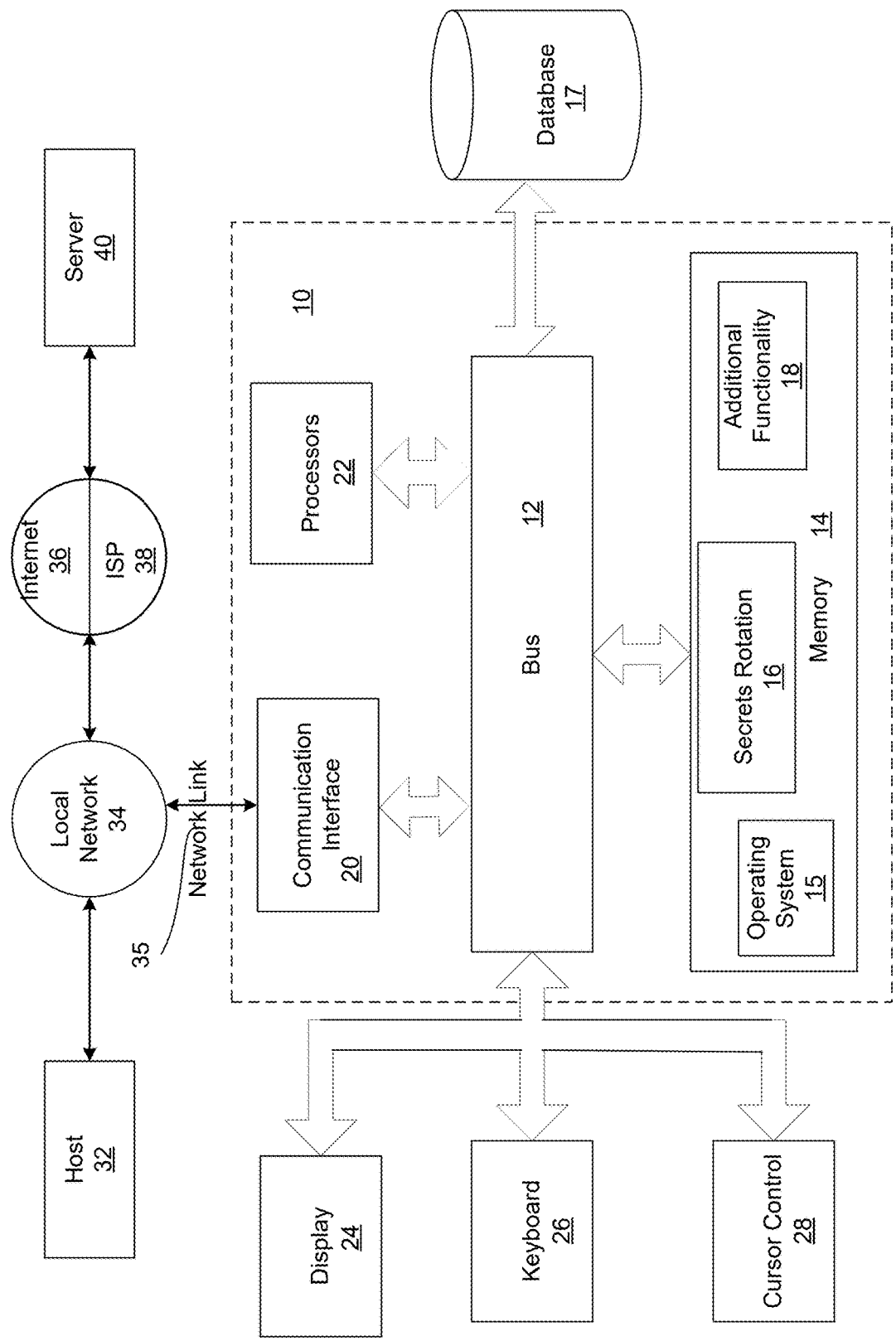
FIG. 2 is a block diagram of a computer server/system in accordance with an embodiment of the present invention that can be used to implement any of the functionality disclosed herein.

FIG. 2 is a block diagram of a computer server/system 10 in accordance with an embodiment of the present invention that can be used to implement any of the functionality disclosed herein. Although shown as a single system, the functionality of system 10 can be implemented as a distributed system. Further, the functionality disclosed herein can be implemented on separate servers or devices that may be coupled together over a network. Further, one or more components of system 10 may not be included. One or more components of FIG. 2 can also be used to implement any of the elements of FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication interface 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a secrets rotation module 16 that provides secrets rotation for secrets stored, and all other functionality disclosed herein. System 10 can be part of a larger system. Therefore, system 10 can include one or more additional functional modules 18 to include the additional functionality that integrates with secrets rotation module 16, such as applications and resources with access control. A file storage device or database 17 is coupled to bus 12 to provide centralized storage for modules 16 and 18, including storage for the secrets, and can implement secrets storage 125. In one embodiment, database 17 is a relational database management system ("RDBMS") that can use Structured Query Language ("SQL") to manage the stored data.

In embodiments, communication interface 20 provides a two-way data communication coupling to a network link 35 that is connected to a local network 34. For example, communication interface 20 may be an integrated services digital network ("ISDN") card, cable modem, satellite modem, or a modem to provide a data communication connection to a corresponding type of telephone line or Ethernet. As another example, communication interface 20 may be a local area network ("LAN") card to provide a data communication connection to a compatible LAN. Wireless links may also be implemented. In any such implementation, communication interface 20 sends and receives electrical, electromagnetic or optical signals that carry digital data streams representing various types of information.

Network link 35 typically provides data communication through one or more networks to other data devices. For example, network link 35 may provide a connection through local network 34 to a host computer 32 or to data equipment operated by an Internet Service Provider ("ISP") 38. ISP 38 in turn provides data communication services through the Internet 36. Local network 34 and Internet 36 both use electrical, electromagnetic or optical signals that carry digital data streams. The signals through the various networks and the signals on network link 35 and through communication interface 20, which carry the digital data to and from computer system 800, are example forms of transmission media.

System 10 can send messages and receive data, including program code, through the network(s), network link 35 and communication interface 20. In the Internet example, a server 40 might transmit a requested code for an application program through Internet 36, ISP 38, local network 34 and communication interface 20. The received code may be executed by processor 22 as it is received, and/or stored in database 17, or other non-volatile storage for later execution.

In one embodiment, system 10 is a computing/data processing system including an application or collection of distributed applications for enterprise organizations, and may also implement logistics, manufacturing, and inventory management functionality. The applications and computing system 10 may be configured to operate locally or be implemented as a cloud-based networking system, for example in an infrastructure-as-a-service ("IAAS"), platform-as-a-service ("PAAS"), software-as-a-service ("SAAS") architecture, or other type of computing solution.

Embodiments provide customers of cloud 104 the ability to automatically rotate secrets for any arbitrary target service (for example, Oracle Database, Postgres, SQL server etc.). In OCI embodiments, secrets rotation system 10 rotate secrets for services that run in the customer's virtual cloud network ("VCN")/Subnet. Embodiments allow the customer to configure automatic rotations at scheduled intervals. Embodiments provide a way to notify customer applications when a secret is rotated. In embodiments, the customer's client applications do not have downtime when the secret is being rotated.

Embodiments support automatic rotation for any such target systems which takes a password and: (1) supports gradual password rollover, (2) supports only one password at a time, by using dual account rotation disclosed below; and/or (3) supports one password at a time, but has a thick client that can poll for two passwords. For example, for the case of an ADB administrative password, there can only be a single administrative account for any ADB. During the process of rotation, after the password is updated in the ADB but before updating it in the SiV service to the latest state, the password will be in a pending state in the SiV. Therefore, if the thick client that reads the passwords from the SiV is able to fallback to reading the pending secret password, then it can connect using that password.

Embodiments support automatic rotation for target systems that do not take in passwords, but return one after setting one, and support two credentials simultaneously. Embodiments support these target system (e.g., Auth token) if the following is met: (1) there is a constraint around like generation of more than two tokens for a user is blocked by target system itself (i.e., for IAM authTokens); or (2) the target system has an API such as listTokens( ) that can return the list/number of active tokens at any point in time. This can be called from within the function to verify count before a createToken( ) is called.

Figure 3:
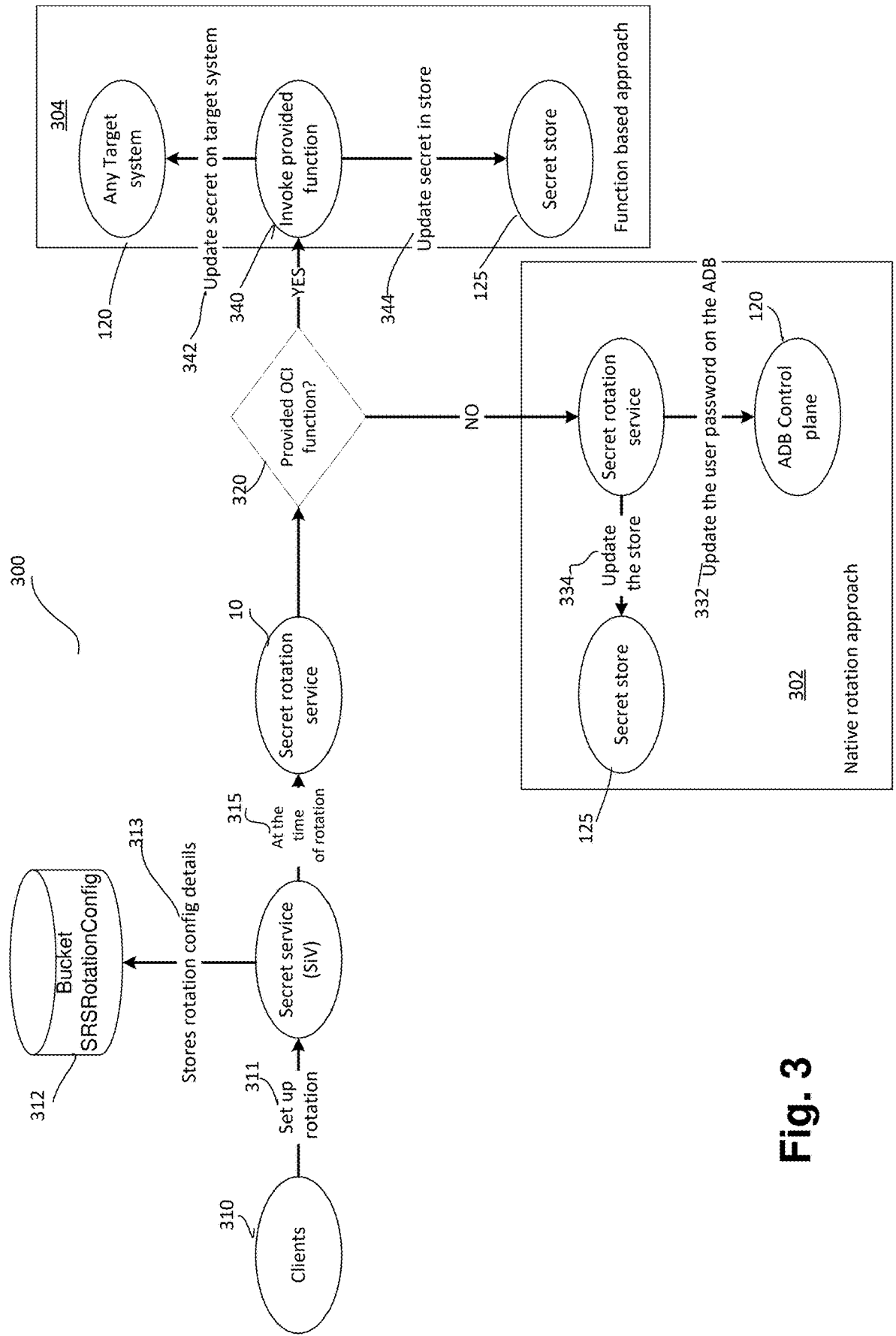
FIG. 3 is a flow/block diagram of the functionality of the secrets rotation module of FIG. 2 when providing secrets rotation in accordance to embodiments.

FIG. 3 is a flow/block diagram of the functionality 300 of secrets rotation module 16 of FIG. 2 when providing secrets rotation in accordance to embodiments. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The embodiment of FIG. 3 is implemented by an OCI cloud 104, but can also be implemented using other known cloud infrastructures.

In general, with functionality 300, for systems that have a supporting infrastructure that performs password rotation, such as a management API that can rotate the password of a database (e.g., a Control Plane ("CP") API), embodiments directly call the API (at 302). For systems that do not have such an API, embodiments implement a functions based approach that leverages a Functions as a Service ("FaaS") function that runs within customer tenancies (at 304). Since failure during rotation is a key problem to be solved, embodiments use the Workflow as a Service ("WFaaS") to manage the rotation workflow.

In order to set up a rotation at 311, a client 310 provides either an identifier of a function (e.g., a Function Oracle Cloud Identifier ("OCID")) that is present in their tenancy, or the unique identifier of the target system 120 OCID, such as an ADB OCID, that allows secret rotating via a management API. The client will also provide a rotation schedule (e.g., rotate secrets every 60 days)

At 313, the rotation configuration details are stored in bucket 312. In embodiments, the rotation configuration includes the following parameters:
rotationInterval—The time interval that indicates the frequency for rotating the secret;
targetSystemDetails—Provides the targetSystem type and type-specific details such as function OCID or target system OCID;
isScheduledRotationEnabled—Boolean field that enables auto-rotation of secret.

At 315, at the time of the rotation, secret rotation service 10 determines at 320 if a function was provided at 311. If yes at 320, at 304 the function based approach is implemented to rotate the secrets. If no at 320, at 302 the API approach is implemented to rotate the secrets. The decision at 320 in embodiments is based on which target system type (Functions or management API based) is provided at 310.

If the API is used to rotate the secret, secret rotation service generates the new secret in pending version in secret store 125 at 332, updates ADB 120 with the newly generated pending secret using the native ADB password rotation API, and at 334 switches the state of the secret from pending to active in the secret store 125.

If the Function is used, the provided function is invoked at 340, which updates the secret at the target system at 342, and updates the secret at the secret storage at 344.

The following steps provide additional details on the Function based approach 304 in accordance to embodiments that implement OCI FaaS:
(1) Verify connection to target system: This step checks if the secret present in current secret version works with the target system. To do this, the Function will call the SiV Data Plane ("DP"), which supports secret get operations, to get the current version of the secret, and tests connection against the target system with the retrieved secret content. This step also passes the current version ("currentSecret") in the output to ensure that the same secret is used to connect to the target system in subsequent steps. In this step, embodiments not only ensure if the current version works with the target system but also warm up the function. This is how embodiments solve for cold start, since there is no write operation performed here.
(2) Create pending version: This step calls the SiV CP, which supports secrets management operations, to add the new pending version. In order to update a secret, the workflow calls the function that calls SiV CP. This secret version's "Stage" attribute will be marked as PENDING when it calls the UpdateSecret( ) API. This ensures that the client apps that consumes this secret still get the version which is marked as CURRENT and not this new one that has not been applied on the target system yet. Customers can write their own secret generation logic or can use the SiV auto-generation feature. To use the SiV auto-generation feature, customers must enable the auto-generation Boolean flag and provide the secret generation context. If auto-generation is enabled, then customers can not provide the secret content, it will be automatically generated.
(3) Update target system: This is the step where the target system is updated. For example, for an ADB secret, this would connect to ADB and modify the credential with the secret generated at Step 2. To do this, first, workflow will invoke the corresponding function. The function code will retrieve the contents of the PENDING version generated. Then it would connect to database with the CURRENT version (Using "currentVersionNo" parameter present in the input) and update the password with the PENDING version. It also verifies a success connect with the pending version. This step also passes the pending version number in the output to ensure the same version number in Step 4 is promoted.
(4) Promote pending version: This step is to update the "Stage" of the newly generate secret version to "CURRENT", so that when the user's applications can reload the new current version and start use the new version.

Here also, workflow will invoke the given function which calls the SIV CP to promote the pending version to current.

Embodiments disclosed above use a single-user rotation scheme to rotate the password for a target system which takes in a password. This strategy updates credentials for one user in one secret. The user must have permission to update their password. This is the simplest rotation strategy, and it is appropriate for most use cases.

When the secret rotates, existing open database connections are not dropped. While rotation is happening, there is a short period of time between when the password in the database changes and when the secret is updated. During this time, there is a low risk of the database denying calls that use the rotated credentials. It is advantageous to use a single rotation strategy when the target system supports gradual rollover, which allows users to move smoothly to the new secret without disruption. After rotation, new connections use the new credentials. However, when the system does not support gradual rollover, there may be downtime during rotation. For these situations, embodiments can use a "dual account rotation" disclosed above.

Dual Account Rotation

Figure 4:
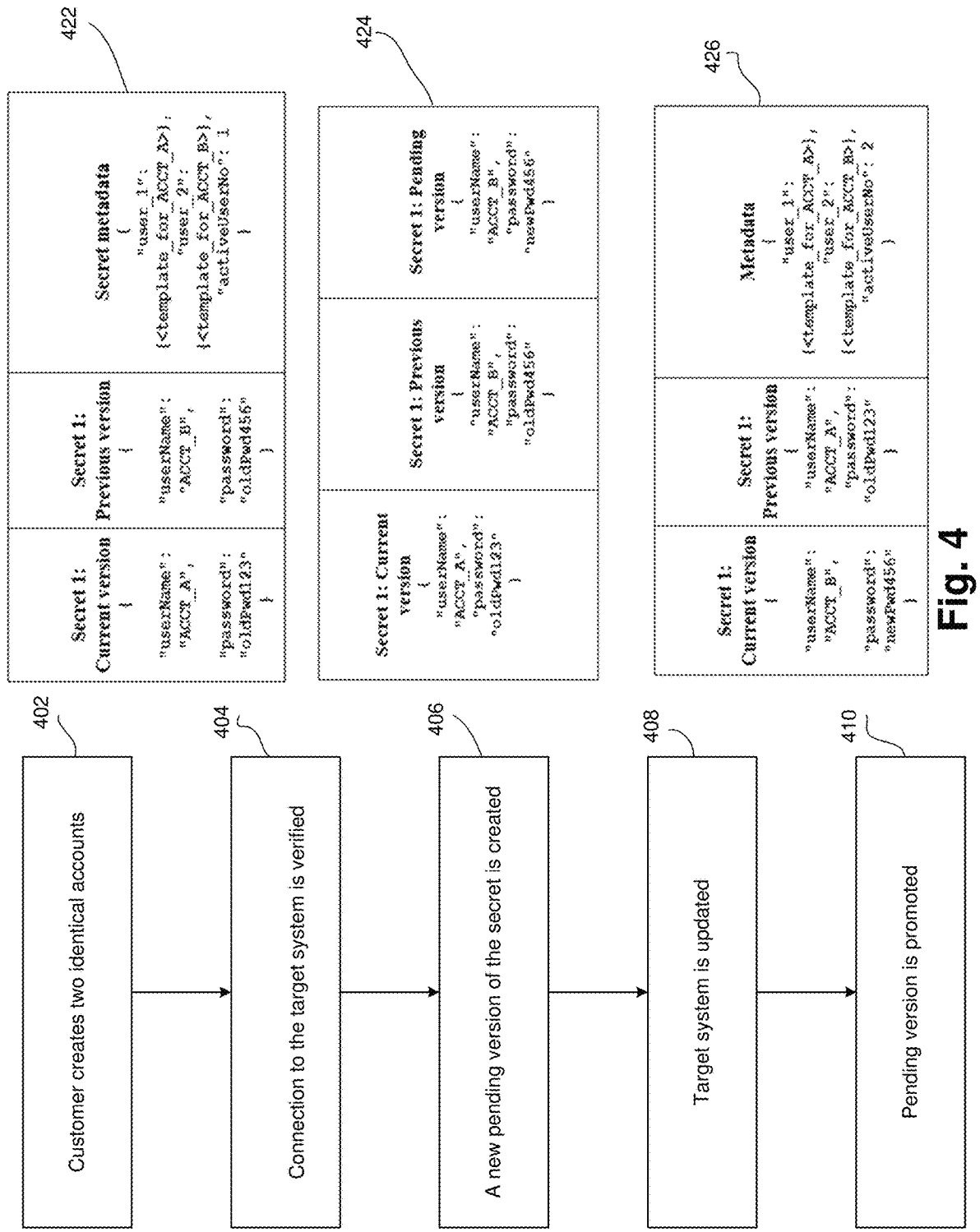
FIG. 4 is a flow/block diagram of the functionality of the secrets rotation module of FIG. 2 when providing secrets rotation using a dual account rotation in accordance to embodiments.

FIG. 4 is a flow/block diagram of the functionality 400 of secrets rotation module 16 of FIG. 2 when providing secrets rotation using a dual account rotation in accordance to embodiments.

Functionality 400 implements a dual account rotation scheme to rotate the password for a target system which takes in password. Embodiments update credentials for two users in one secret. A customer needs to create two accounts/users which have the same permissions. The accounts can be for the same person. Every time the secret rotates, the rotation function alternates which user's password it updates. Functionality 400 is appropriate for applications that require high availability. If an application retrieves the secret during rotation, the application still gets a valid set of credentials. After rotation, both account credentials will be valid.

Most databases have multiple users who have varying degree of privileges on the data stored in the database, database structure, and administrative operations. In multi-user database environments, it is important to grant and limit the privileges of different users based on their roles and needs. It is also a best practice to limit the lifespan of a user's credentials, passwords in particular, to enhance the security posture.

At 402, the customer creates two identical accounts (e.g., "ACCT_A" and "ACCT_B"), each having identical permissions, and stores their passwords/credentials in a single secret, one in the current version and other in previous version. The password will be different for the two users, and therefore they are created as two versions but within the same secret storage for the corresponding secret. The customer also needs to have both the account templates present in the secret metadata along with the template which is used in the current version. Metadata for a secret can be any additional data that the customer wishes to store, along with the secret, typically some information relating to the secret. In embodiments, in order to facilitate dual rotation, the customer is asked to specify the current version's template in the metadata, so that it is known which one needs to be rotated first.

Assume customer stores the ACCT_B details in the CURRENT version, then the customer needs to have the other account details (ACCT_A) in the PREVIOUS version. However, they can continue to connect to the target system with the credentials present in the CURRENT version. 420 illustrates the current state after 402.

At 404, the connection to the target system is verified by secrets rotation system 10 to determine if the customer is able to successfully connect to the target system with the previous version.

At 406, a new pending version of the secret is created. At the time of rotation, secrets rotation system 10 will first create a new pending version using the template determined by the "activeUserNo" field present in the metadata. 422 illustrates the current state after 406.

At 408, the target system is updated. Secrets rotation system 10 connects to the target system using the previous version and then updates the target system to use the pending version. Before promoting the pending version, secrets rotation system 10 verified that this version connects to the target system.

At 410, the pending version is promoted by promoting the pending version to current. The activeUserNo in the metadata will also be updated. This can be done in a single UpdateSecret API call. 424 illustrates the current state after 410 and after the functionality of FIG. 4.

In contrast with known dual rotation approaches, embodiments require that the creation of the accounts be done by the customer and provided to system 10. Embodiments make use of a single secret to store both passwords as different secret versions. In contrast, known approaches store the passwords in two separate secrets and returns the correct secret/config to the customer when they want to read the secret. In embodiments, since only a single secret inside the vault/storage 125 is maintained (which can have multiple versions inside of it), embodiments can guarantee that the latest version in that secret will always be a valid one.

Further, embodiments do not create any additional DB user accounts other than the two provided. In contrast, with known approaches, a new user is created every time a rotation takes place so that the function needs to be given extra permissions to create users. In contrast, since embodiments work with just the two accounts already created, embodiments do not need permission to create new DB user accounts.

Example Cloud Infrastructure

FIGS. 5-8 illustrate an example cloud infrastructure that can incorporate network cloud 104 that can include secrets rotation system 10 of FIG. 1 in accordance to embodiments.

As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM's), install operating systems ("OS"s)

on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
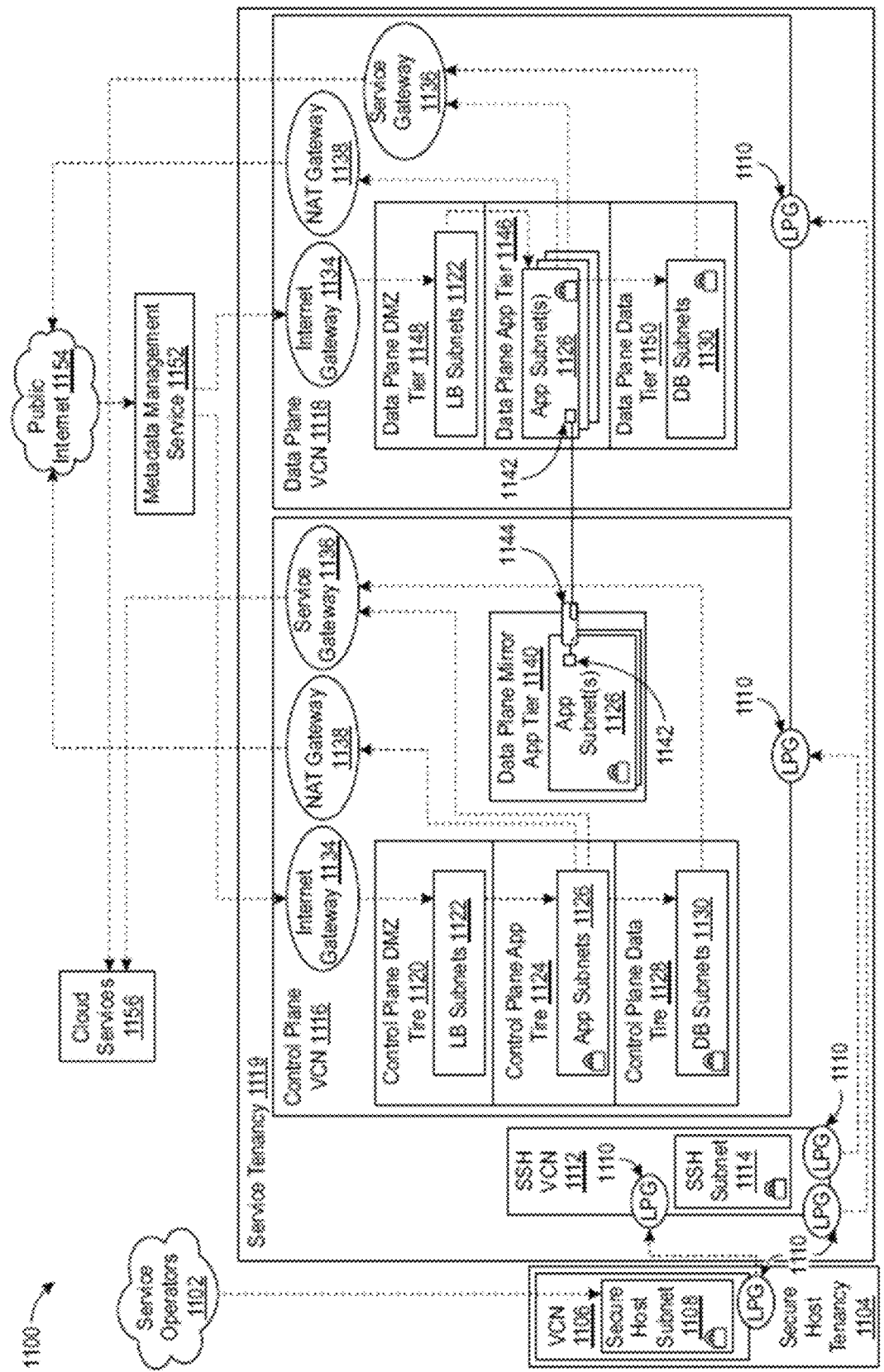
FIGS. 5-8 illustrate an example cloud infrastructure that can incorporate a network cloud that can include the secrets rotation system of FIG. 1 in accordance to embodiments.

FIG. 5 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 6:
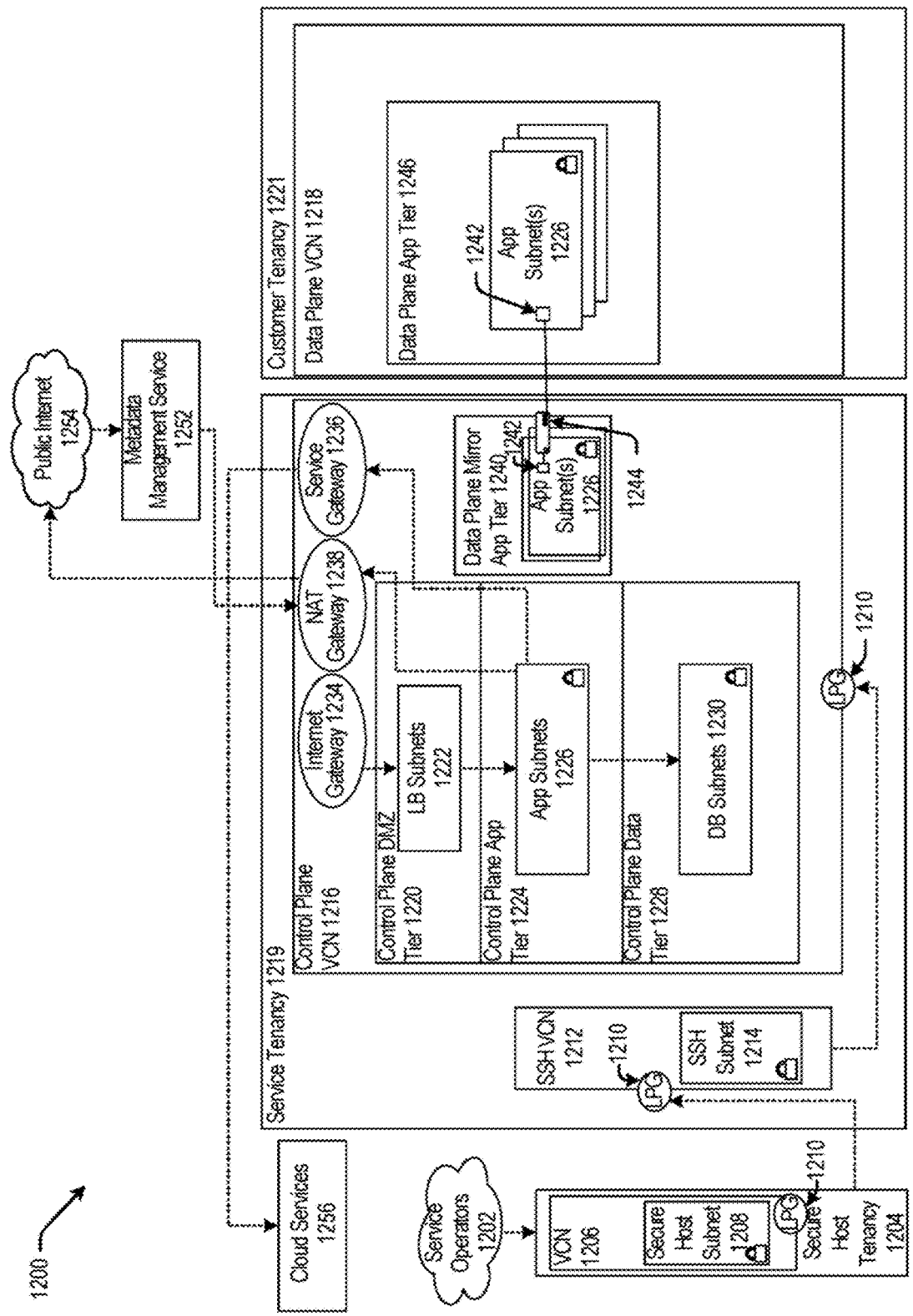

FIG. 6 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 7:
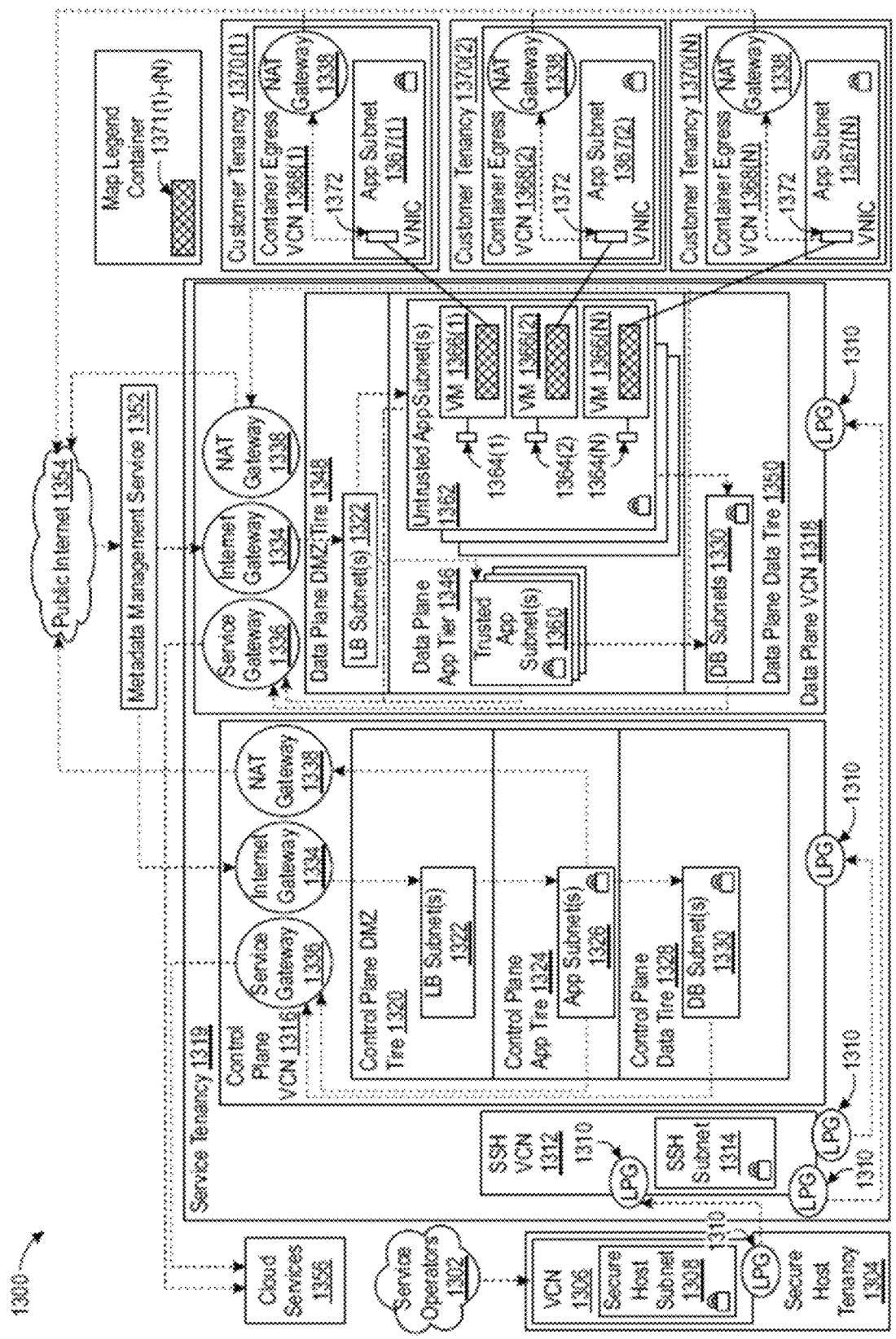

FIG. 7 is a block diagram 1300 illustrating another example pattern of an IaaS architecture, according to at least one embodiment. Service operators 1302 (e.g. service operators 1102) can be communicatively coupled to a secure host tenancy 1304 (e.g. the secure host tenancy 1104) that can include a virtual cloud network (VCN) 1306 (e.g. the VCN 1106) and a secure host subnet 1308 (e.g. the secure host subnet 1108). The VCN 1306 can include an LPG 1310 (e.g. the LPG 1110) that can be communicatively coupled to an SSH VCN 1312 (e.g. the SSH VCN 1112) via an LPG 1310 contained in the SSH VCN 1312. The SSH VCN 1312 can include an SSH subnet 1314 (e.g. the SSH subnet 1114), and the SSH VCN 1312 can be communicatively coupled to a control plane VCN 1316 (e.g. the control plane VCN 1116) via an LPG 1310 contained in the control plane VCN 1316 and to a data plane VCN 1318 (e.g. the data plane 1118) via an LPG 1310 contained in the data plane VCN 1318. The control plane VCN 1316 and the data plane VCN 1318 can be contained in a service tenancy 1319 (e.g. the service tenancy 1119).

The control plane VCN 1316 can include a control plane DMZ tier 1320 (e.g. the control plane DMZ tier 1120) that can include load balancer ("LB") subnet(s) 1322 (e.g. LB subnet(s) 1122), a control plane app tier 1324 (e.g. the control plane app tier 1124) that can include app subnet(s) 1326 (e.g. similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g. the service gateway) and a network address translation (NAT) gateway 1338 (e.g. the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g. the data plane DMZ tier 1148), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 8:
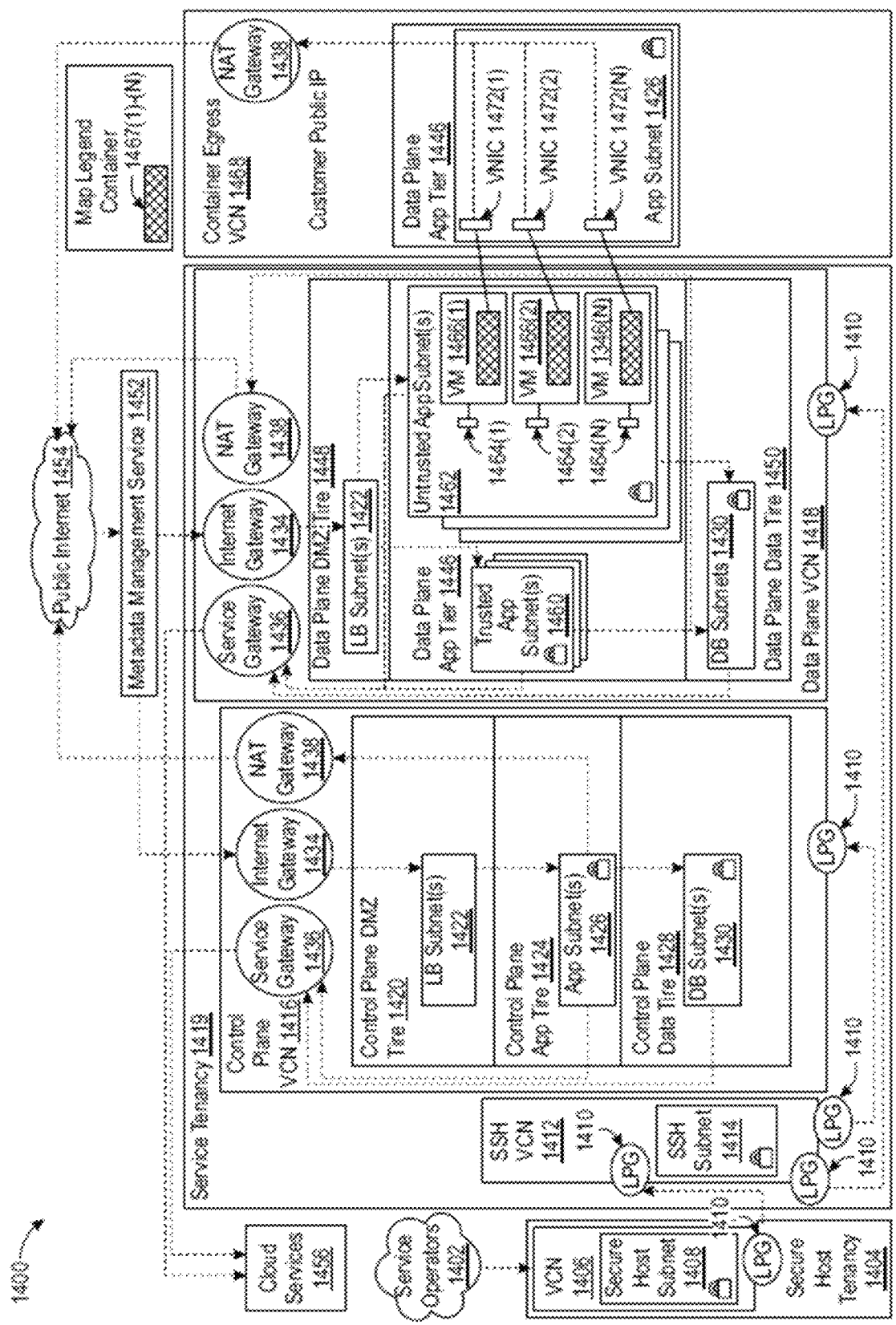

FIG. 8 is a block diagram 1400 illustrating another example pattern of an IaaS architecture, according to at least one embodiment. Service operators 1402 (e.g. service operators 1102) can be communicatively coupled to a secure host tenancy 1404 (e.g. the secure host tenancy 1104) that can include a virtual cloud network ("VCN") 1406 (e.g. the VCN 1106) and a secure host subnet 1408 (e.g. the secure host subnet 1108). The VCN 1406 can include an LPG 1410 (e.g. the LPG 1110) that can be communicatively coupled to an SSH VCN 1412 (e.g. the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g. the control plane VCN 1116) via an LPG 1410 contained in the control plane VCN 1416 and to a data plane VCN 1418 (e.g. the data plane 1118) via an LPG 1410 contained in the data plane VCN 1418. The control plane VCN 1416 and the data plane VCN 1418 can be contained in a service tenancy 1419 (e.g. the service tenancy 1119).

The control plane VCN 1416 can include a control plane DMZ tier 1420 (e.g. the control plane DMZ tier 1120) that can include LB subnet(s) 1422 (e.g. LB subnet(s) 1122), a control plane app tier 1424 (e.g. the control plane app tier 1124) that can include app subnet(s) 1426 (e.g. app subnet(s) 1126), a control plane data tier 1428 (e.g. the control plane data tier 1128) that can include DB subnet(s) 1430 (e.g. DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 8 may be considered an exception to the pattern illustrated by the architecture of block diagram 1300 of FIG. 7 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

As disclosed, embodiments provide secrets rotation for target systems. Embodiments can leverage existing APIs where possible and recommend a Functions based approach for other use cases. Embodiments solve downtime-less rotation by leveraging dual account rotation. Embodiments allow users to choose a provided secrets generation solution or a customer provided secret generation logic.

Embodiments provide flexibility to customers to either use their own generation logic or use the secret generation feature provided by the SiV. Embodiments support automatic secret rotation for any target system that meets the following criteria of a target system that takes in password and: (1) Supports gradual password rollover; (2) Supports only one password at a time but can use our proposed dual account rotation; or (3) Supports one password at a time, but has a thick client that can poll for two passwords.

Embodiments leverage the workflow service ("WFaaS") to have the orchestration and retry support between the multiple steps of a secret rotation. Embodiments have verification in place which ensures that rotation is not triggered if certain checks are not met, so as to ensure that rotation does not take place in the unsafe situations.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A cloud-based method of rotating a secret stored in a secrets storage of a cloud-based infrastructure and stored in a target system, the method comprising:
   receiving an identifier of a function for rotating the secret or an identifier of the target system when the target system comprises a management Application Programming Interface (API) for rotating the secret;
   determining that the secret needs to be rotated based on a rotating schedule;
   when the identifier of the function is received, rotating the secret using the function; and
   when the identifier of the target system is received, rotating the secret using the management API;
   wherein rotating the secret comprises updating the secret at the secrets storage and at the target system;
   wherein the rotating the secret using the function comprises verifying a connection to the target system, creating a pending version of a first new secret; updating the target system with the first new secret and promoting the pending version of the first new secret to a current secret at the secrets storage.

2. The method of claim 1, wherein the rotating the secret using the management API comprises:
   generating a second new secret as a pending secret in the secrets storage;
   updating the target system with the pending secret using the management API; and
   switching a state of the second new secret from pending to active in the secrets storage.

3. The method of claim 2, wherein the target system is an autonomous database.

4. The method of claim 1, wherein the cloud-based infrastructure comprises a first virtual cloud network (VCN) comprising a local peering gateway (LPG) communicatively coupled to a secure shell (SSH) VCN via the LPG;
   wherein the LPG is contained in a control plane VCN and the SSH VCN is communicatively coupled to a data plane VCN.

5. The method of claim 1, wherein the secret comprises one of a database password, identity username/password or a private key.

6. The method of claim 1, further comprising:
   receiving a first account and a second account from a user, the first account and second account having identical permissions, the first account having a current version secret and the second account having a previous version secret;
   storing the current version secret and the previous version secret at the secret storage corresponding to a same secret;
   creating a pending version secret corresponding to the same secret;
   connecting to the target system using the previous version secret; and
   updating the target system to use the pending version secret.

7. The method of claim 1, further receiving a rotation interval comprising a frequency for rotating the secret.

8. A non-transitory computer readable medium having instructions stored thereon that, when executed by one or more processors, cause the processors to provide a cloud-based rotating of a secret stored in a secrets storage of a cloud-based infrastructure and stored in a target system, the rotating comprising:
   receiving an identifier of a function for rotating the secret or an identifier of the target system when the target system comprises a management Application Programming Interface (API) for rotating the secret;
   determining that the secret needs to be rotated based on a rotating schedule;
   when the identifier of the function is received, rotating the secret using the function; and
   when the identifier of the target system is received, rotating the secret using the management API;
   wherein rotating the secret comprises updating the secret at the secrets storage and at the target system;
   wherein the rotating the secret using the function comprises verifying a connection to the target system, creating a pending version of a first new secret; updating the target system with the first new secret and promoting the pending version of the first new secret to a current secret at the secrets storage.

9. The computer readable medium of claim 8, wherein the rotating the secret using the management API comprises:
   generating a second new secret as a pending secret in the secrets storage;
   updating the target system with the pending secret using the management API; and
   switching a state of the second new secret from pending to active in the secrets storage.

10. The computer readable medium of claim 9, wherein the target system is an autonomous database.

11. The computer readable medium of claim 8, wherein the cloud-based infrastructure comprises a first virtual cloud network (VCN) comprising a local peering gateway (LPG) communicatively coupled to a secure shell (SSH) VCN via the LPG;

wherein the LPG is contained in a control plane VCN and the SSH VCN is communicatively coupled to a data plane VCN.

12. The computer readable medium of claim 8, wherein the secret comprises one of a database password, identity username/password or a private key.

13. The computer readable medium of claim 8, the rotating further comprising:
receiving a first account and a second account from a user, the first account and second account having identical permissions, the first account having a current version secret and the second account having a previous version secret;
storing the current version secret and the previous version secret at the secret storage corresponding to a same secret;
creating a pending version secret corresponding to the same secret; connecting to the target system using the previous version secret; and
updating the target system to use the pending version secret.

14. The computer readable medium of claim 8, further receiving a rotation interval comprising a frequency for rotating the secret.

15. A cloud-based secret rotation system comprising:
a secrets storage;
a communications link to a target system;
one or more processors executing instructions and configured to:
receive an identifier of a function for rotating the secret or an identifier of the target system when the target system comprises a management Application Programming Interface (API) for rotating the secret;
determine that the secret needs to be rotated based on a rotating schedule;
when the identifier of the function is received, rotate the secret using the function; and
when the identifier of the target system is received, rotate the secret using the management API;
wherein rotating the secret comprises updating the secrets at the secret storage and at the target system;
wherein the rotating the secret using the function comprises verifying a connection to the target system, creating a pending version of a first new secret; updating the target system with the first new secret and promoting the pending version of the first new secret to a current secret at the secrets storage.

16. The system of claim 15, wherein the rotating the secret using the management API comprises:
generating a second new secret as a pending secret in the secrets storage;
updating the target system with the pending secret using the management API; and
switching a state of the second new secret from pending to active in the secrets storage.

17. The system of claim 16, wherein the target system is an autonomous database.

18. The system of claim 15, wherein the system is executed on a cloud infrastructure, the cloud infrastructure comprising a first virtual cloud network (VCN) comprising a local peering gateway (LPG) communicatively coupled to a secure shell (SSH) VCN via the LPG;
wherein the LPG is contained in a control plane VCN and the SSH VCN is communicatively coupled to a data plane VCN.

19. The system of claim 15, wherein the secret comprises one of a database password, identity username/password or a private key.

20. The system of claim 15, further comprising:
receiving a first account and a second account from a user, the first account and second account having identical permissions, the first account having a current version secret and the second account having a previous version secret;
storing the current version secret and the previous version secret at the secret storage corresponding to a same secret;
creating a pending version secret corresponding to the same secret; connecting to the target system using the previous version secret; and
updating the target system to use the pending version secret.

* * * * *